US009057931B1

(12) United States Patent
Baldwin

(10) Patent No.: US 9,057,931 B1
(45) Date of Patent: Jun. 16, 2015

(54) DISPLAY INTEGRATED CAMERA

(75) Inventor: Leo B. Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 356 days.

(21) Appl. No.: 13/523,503

(22) Filed: Jun. 14, 2012

(51) Int. Cl.
  H04N 7/14 (2006.01)
  G03B 7/00 (2014.01)
  G02F 1/00 (2006.01)

(52) U.S. Cl.
  CPC ... *G03B 7/00* (2013.01); *G02F 1/00* (2013.01)

(58) Field of Classification Search
  USPC ............... 348/14.01–14.16; 709/201–207, 709/217–248
  See application file for complete search history.

(56) References Cited

U.S. PATENT DOCUMENTS

| 8,451,279 | B2 * | 5/2013 | Gorla et al. | 345/501 |
| 2004/0212555 | A1 * | 10/2004 | Falco | 345/50 |
| 2005/0219357 | A1 * | 10/2005 | Sun et al. | 348/57 |
| 2007/0002130 | A1 * | 1/2007 | Hartkop | 348/14.16 |
| 2007/0139345 | A1 * | 6/2007 | Shie et al. | 345/98 |
| 2007/0146294 | A1 * | 6/2007 | Nurmi et al. | 345/102 |
| 2007/0146300 | A1 * | 6/2007 | Wu et al. | 345/102 |
| 2007/0146301 | A1 * | 6/2007 | Fu et al. | 345/102 |
| 2008/0225109 | A1 * | 9/2008 | Lee | 348/14.02 |
| 2010/0097439 | A1 * | 4/2010 | Kroll et al. | 348/14.02 |
| 2011/0279689 | A1 * | 11/2011 | Maglaque | 348/207.1 |
| 2013/0278844 | A1 * | 10/2013 | Hong et al. | 349/1 |

* cited by examiner

*Primary Examiner* — Hemant Patel
(74) *Attorney, Agent, or Firm* — Novak Druce Connolly Bove + Quigg LLP

(57) ABSTRACT

The experience of a user of a computing device for tasks such as videoconferencing and video chat can be improved by integrating a camera in a display screen of the computing device, which can enable the user to appear to be looking at the camera (and thus other users on the video session) while still looking at the display screen. The camera can be configured to look in between and/or through pixel elements of the display screen. In at least some embodiments the camera can be synchronized with the duty cycle of the display screen to capture image information between duty cycles of the display screen, such that the light from the display does not saturate the camera. Microlens arrays, diffractive lenses, and other such elements can be used to capture the light available through the display screen.

23 Claims, 6 Drawing Sheets

DISPLAY INTEGRATED CAMERA

BACKGROUND

People are increasingly using portable computing devices for a wider variety of tasks. As an example, an increasing number of people are turning to network-based videoconferencing and video chat applications and services, such as Skype®, Google Chat®, and iChat®. In order to utilize these applications and services, a user will utilize a webcam or other such device to capture live video of the user, which then can be broadcast to at least one other person with whom the user is communicating. The user will typically be looking at a display screen where video of the other person is being displayed. Because the camera is offset from the display screen, the user will appear to be looking somewhere other than "at" the user in the captured video information. Such an approach can be at least somewhat undesirable for users, as a person on the other end of a videoconference or video chat will appear to not be looking the user in the eyes, or in most cases even looking towards the user at all, even though the person is actually looking at the user in the displayed video image.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing image input to an electronic device. In particular, approaches discussed herein provide at least one camera positioned to enhance interactive communications, such as videoconferences, video chats, interactive games, and other such applications and services. In at least some embodiments, a camera can be positioned such that a field of view of the camera looks through at least part of a display element of a computing device. For example, a camera can be positioned behind, or incorporated at least partially within, a display screen component of a computing device. The camera can be positioned at a location where another user's face is likely to be during a video chat, for example, such that when the user is looking at the face of the person displayed on the video screen the user will also be looking in the general direction of the camera. Using such an approach, the captured image or video of the user that is then displayed on another viewer's device will cause the user to appear to be looking more toward the viewer than if the user had been captured by a camera that was offset from the display screen.

In at least some embodiments, a camera can be placed behind transparent layers of a display screen such that the camera can capture light incident on, and passing through, the display screen. In at least some embodiments the camera can be configured to capture information in between duty cycles of the display screen, in order to prevent that camera from being saturated by light emitted from the pixels of the display. In other embodiments, a camera can take advantage of an array of microlenses that can capture image information received between the pixels of the display screen. An image processing algorithm can assemble the image from the information captured by the microlenses, which in at least some embodiments can also provide at least some control over the effective focal plane for the resulting image.

Many other alternatives and variations are described and suggested below in relation to at least some of the various embodiments.

Figure 1A:
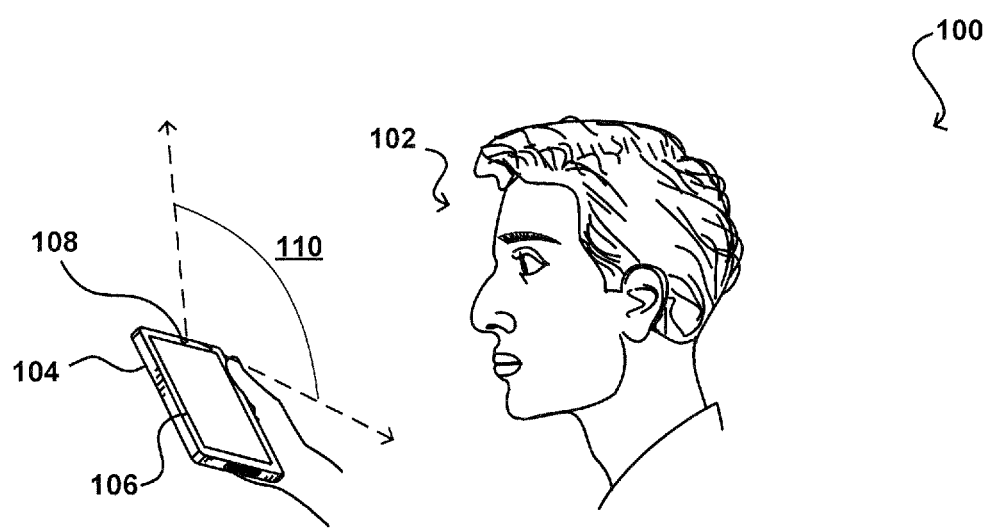
FIGS. 1(a) and 1(b) illustrates an example situation wherein a user is interacting with a computing device to conduct a video chat, where the appearance of another person in the video chat will be displayed in a location offset from a front-facing camera.

FIG. 1 illustrates an example situation 100 wherein a user 102 is interacting with a portable computing device 104. The computing device 104 can be any appropriate device, such as a smart phone, tablet computer, or personal data assistant. In this example, the user 102 is engaging in a videoconference with another person. As part of the videoconference, video of the user is captured using at least one camera 108, with the video being transmitted to one or more other people participating in the video conference. Further, video information of one or more other people also can be displayed on a display screen 106 of the computing device 104. Video of the user can be captured as long as the user is within a field of view 110 of the video camera 108. As discussed, however, the user typically will be looking at the display screen and not at the camera 108 of the device.

Figure 1B:
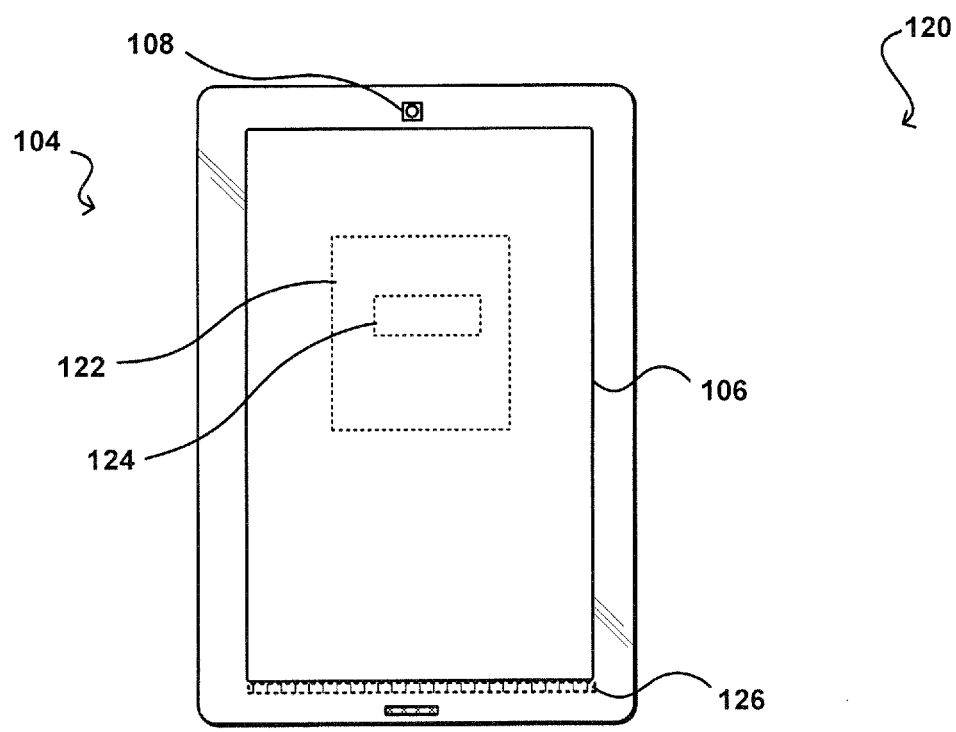

As an example, FIG. 1(b) illustrates a front view 120 of the example computing device 104. During a significant portion of the videoconference, the user likely will be looking at the face of another person displayed on the display screen 106, where that person's face typically will be displayed in a particular region 122 for a particular orientation of the device (e.g., landscape or portrait orientation). More particularly, a user will often be looking at a region 124 where the person's eyes are most likely to be located. As can be seen, however, the video camera 108 is located at distance from either of these regions 122, 124. The video captured of that user, however, will be taken from the perspective of the video camera 108, such that a user looking towards one of these regions 122, 124 will appear to be looking "downward" relative to a center point of the captured video. Thus, the user will appear to be looking at a location other than the viewer when a viewer receives the corresponding video feed. For devices using webcams or other components that are not directly associated with a display, the relative orientation can vary drastically and the gaze location of the user can appear to be even further away from the viewer in the captured video information.

Accordingly, it would be desirable in at least some embodiments to position a camera in a middle portion of the display screen 106. Putting a camera in front of the display screen can be undesirable, as the camera would block a portion of the display screen, which can be particularly undesirable if placed in a middle portion of the screen. Placing the camera behind the screen can also come with various downsides. For example, a display device typically utilizes a backlight with a reflective layer that is not transparent. Even if that layer were removed, however, elements such as the polarizers, gratings, color filters, and other such layers can prevent the camera from being able to capture a clear image. Further still, the display can include an array of LEDs or light from a light bar 126 that is directed through a liquid crystal layer, for example, and this amount of intense light can saturate the camera such that video information will be unable to be obtained with reasonable quality in many situations.

Figure 2:
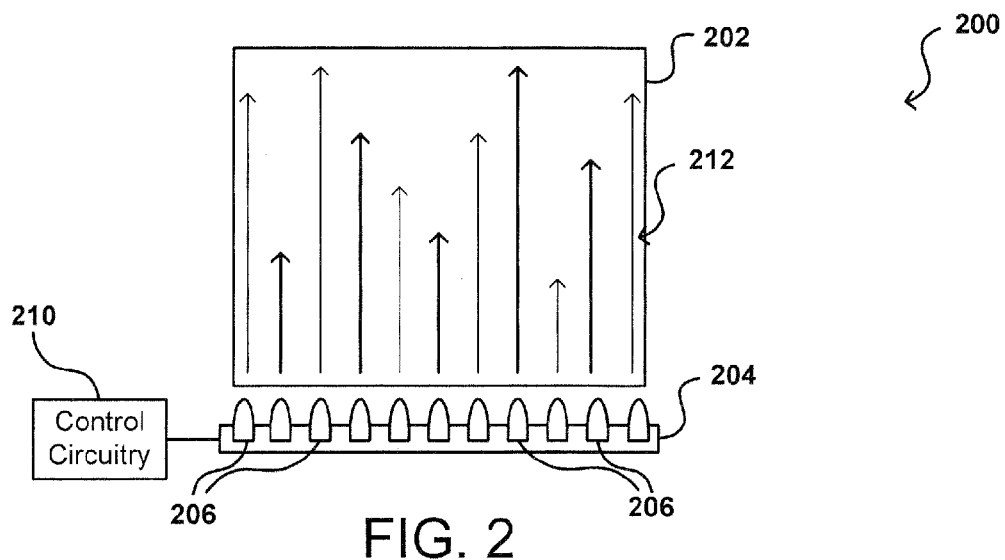
FIG. 2 illustrates an example of a light bar including a plurality of light emitting diodes LEDs positioned to direct light into a display element that can be used in accordance with various embodiments.
Figure 3:
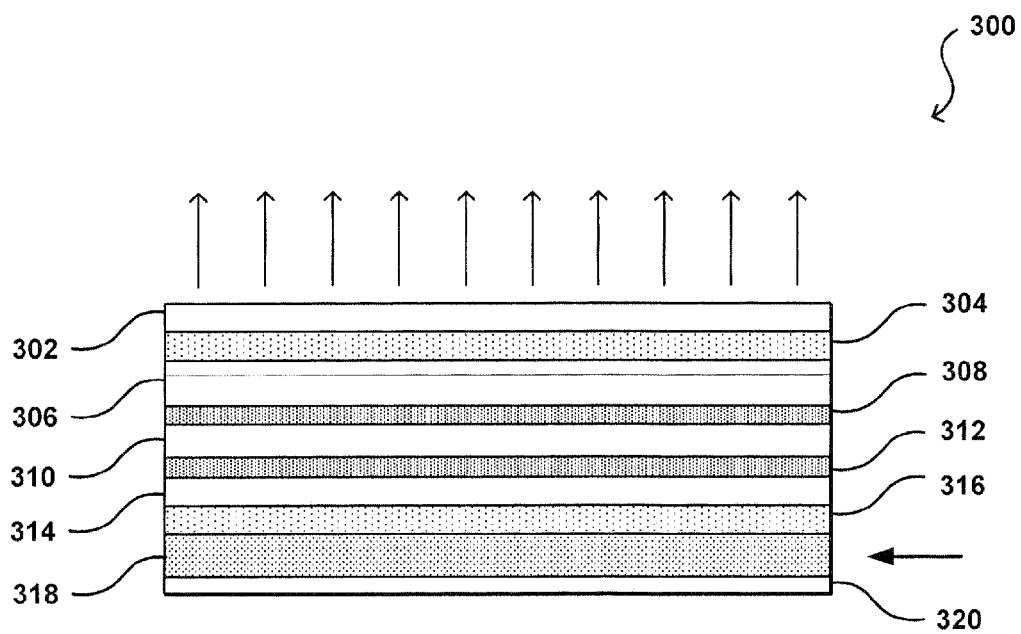
FIG. 3 illustrates an example stack of a display element that can be used in accordance with various embodiments.

To better understand an approach that can be utilized in accordance with various embodiments, FIGS. 2 and 3 illustrate an example display device with which various cameras can be integrated. For example, FIG. 2 illustrates an example configuration 200 of a light bar 204 and display element that can be used in accordance with various embodiments. As used herein, "light bar" can refer generically to any array or assembly of illumination elements that may or may not be connected to each other by a physical bar or other such assembly, but may simply be mounted on a printed circuit board (PCB) or flexible substrate, etc. In this example, the display element 202 is shown in a "top view" and the radiation 212 propagating through the display element is light (e.g., visible or infrared (IR)) from the light sources (e.g., LEDs) of the light bar. In conventional displays the light from the LEDs might be directed through a grating layer before being directed up and out of the display, which would be out of the plane of FIG. 2. It should be understood, however, that orientations and directions such as "up" and "front" when referring to a device are used for purposes of simplicity of explanation, and are not intended to require a certain orientation unless otherwise stated. In various embodiments, however, a light bar used for touch input might be positioned or configured such that the light is incident directly into a side of the transmissive material 202. The LEDs can be driven by control circuitry 210 to direct light along determined paths in the transmissive medium, with the light from the various sources capable of being generated concurrently, one at a time, or in various other combinations as discussed or suggested elsewhere herein.

FIG. 3 illustrates an example stack 300 of an LCD display element such as the element 202 illustrated in FIG. 2. In this example, light is directed into a backlight layer 318, as discussed above, which can include elements such as a grating for directing light "up" through the stack. A reflective layer 320 can be positioned at, or near, the bottom of the stack to reflect any incident light back up through the stack. The light can pass through a first quarter polarizer 316 and one or more other layers 314, as may include a glass sheet, half mirror, optical film, or other such material. It should be understood that additional, fewer, or alternative layers can be used in similar or alternative orders in other display elements. The light can pass through a first transparent electrode layer 312, a layer of liquid crystal material 310, and a second transparent electrode layer 308. As known in the display arts, the electrodes can be used to change a state of the liquid crystal material by applying a determined current, which can change a polarization state of the light to enable selected portions of the light to pass from the display element. The light then can pass through a glass cover sheet 306 and one or more additional layers 304, as may include a retardation film, a scattering film, and the like. The light then can be incident on a second quarter wave polarizer 302 such that, if the liquid crystal layer did not adjust the polarization, the light will not pass through the polarization layer (the two polarization layers being ninety degrees out of phase). If, however, the liquid crystal layer was activated and the polarization changed, at least a portion of the light can pass through the top of the display element (and any protective or anti-glare films, etc.).

As discussed, however, the reflective layer 320 generally will not be transparent, and the refractive elements of the backlight 318 can cause any image captured by a camera behind the backlight to be blurry or otherwise nonsensical. Further, the light of the backlight can saturate the camera when the display is active, and the polarizers will prevent light from passing to the camera unless the display is activated.

Figure 4A:
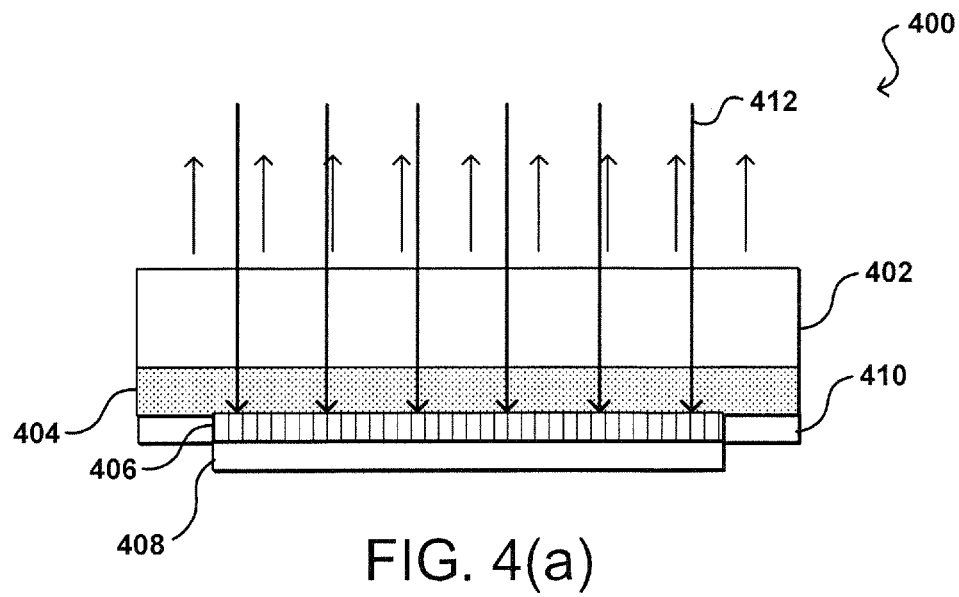
FIGS. 4(a) and 4(b) illustrate example a first example configuration of a display-integrated camera that can be utilized in accordance with various embodiments.

Approaches in accordance with various embodiments can address at least some of these and other such issues with conventional display approaches that can enable a camera to be successfully integrated with a display element of various types of devices. For example, FIG. 4(a) illustrates an example cross-sectional view 400 of a display element with an integrated camera that can be utilized in accordance with various embodiments. Although fewer layers are illustrated than are shown and described with respect to FIG. 3, it should be understood that similar (and other such) elements can be utilized with the display elements of FIG. 4(a). In this example, an active display layer 402 (e.g., a liquid crystal layer) receives light from a backlight layer 404 for generating a display of information. As discussed, the backlight can include a reflective layer 410, such as a white plastic piece in some examples, that reflects at least a portion of the light incident on the element back through the active layer 402. In this example, however, an opening is formed in the reflective element 410 such that a camera sensor 406 can be positioned to capture light passing through the active and backlight layers. It should be understood, however, that in some embodiments the reflective material might not be included with the camera element.

The pixels of the camera sensor 406 on a camera chip 408 can be positioned to capture light passing between and/or through the pixel regions of the active layer. In at least some embodiments, the camera sensor can be configured to capture incident light only between activation times of the display element. Further, since a duty cycle of the video camera may be less than that of the display, the camera can capture (or at least store captured) image information after a number of duty cycles of the display. For example, if the display has a refresh rate of 300 Hz and the camera has a capture rate of 30 Hz, the camera can capture light after every tenth refresh of the display element.

As discussed, the backlight element 404 can be substantially transparent, although conventional backlight layers can contain elements that prevent clear images from being captured. For example, the backlight can include a refractive grating layer that can scatter incident light such that a clear image cannot be captured from behind the backlight in conventional devices. Further, many conventional backlights utilize an array of prisms to direct the light, which can substantially distort any light incident on the prisms before that light is captured by the camera. In this example, however, the backlight utilizes a diffractive surface for directing the light from a light bar or other such source up through the display element. While the diffractive elements can still slightly affect the incident light, the resulting image will be significantly better than for a prism array, and can be sufficient for an application such as video chat that may utilize a lower resolution in order to reduce bandwidth requirements when transmitting the video across a network.

As discussed, the active layer is transparent in many embodiments, at least when activated. For example, a liquid crystal layer can be activated with a "white" appearance to change a polarization of substantially all light passing through the material in order to allow light incident on the display screen to pass through the liquid crystal layer (and, more importantly, the polarizers) and be incident on the camera sensor 406. Thus, the camera pixels can effectively look "through" the pixels in the on state, and can capture a substantial amount of light incident on the display screen. In at least some embodiments the pair of polarizers being ninety degrees out of phase can significantly reduce the amount of light passing through to the camera, such as by 40-50%, but the sensitivity of the camera can be adjusted accordingly. And, as discussed, the duty cycle of the camera can be less than that of the display, such that in some embodiments the camera can capture light over multiple duty cycles of the display before reading out the image data for transmission.

As known in the art, many LCD displays utilize an array of color filters to provide the desired image. In at least some embodiments, the color filters can be used as color filters for the camera. Light can be received that is already separated by component, for example, and the received light can be processed using an image composition algorithm to generate an appropriate image. In other embodiments without color filters, an interleaved image or other such image can be captured that can be analyzed, processed, or transmitted as known for such types of image capture. Further, front lighting or other lighting approaches can be used as well within the scope of the various embodiments, which may or may not require a reflective element 508.

Figure 4B:
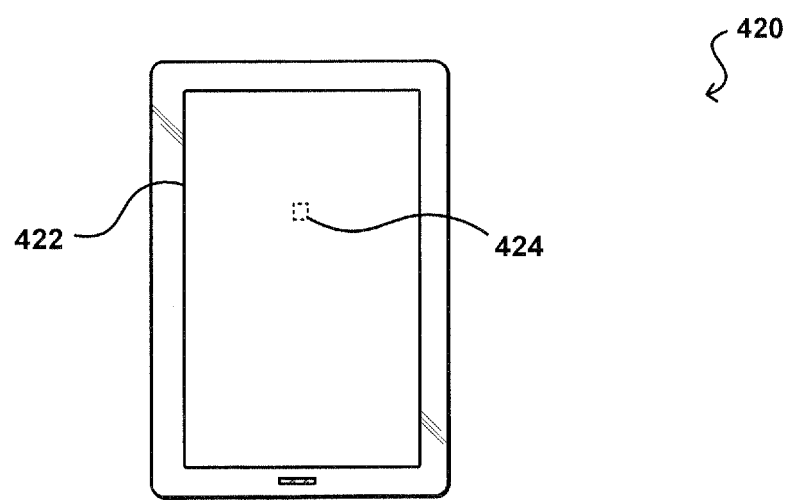

As may be apparent from the description, inserting a camera in place of a portion of a reflective layer may cause a corresponding portion of the display to appear slightly dimmer in at least some embodiments, although other lighting or reflective approaches can be used to compensate for any dimming in other embodiments. As illustrated in the example situation 520 of FIG. 4(*b*), a slightly dim region 524 can appear in a region of the display screen 522 corresponding to the location of the camera. For at least certain embodiments this can cause the user to be directed to, and/or reminded of, the location of the camera, such that the user can focus on an appropriate region of the screen. Such a guide can be advantageous in at least some circumstances, as a user looking at the wrong portion of the screen can cause the user to appear to be looking at a viewer's hair, clothes, or chest, which can in some instance be worse than if the user had appeared to be looking away from the view using conventional approaches. In some embodiments, an icon or graphical element might at least occasionally appear to guide the user to look toward the camera to assist the user in maintaining the desired effect.

Similar approaches can be used with display devices such as LED or AMOLED (active-matrix organic light-emitting diode) displays. In such devices, the camera can still be configured to look through the pixels while those pixels are in the off state (as active pixels can emit light in two directions, which can saturate the camera as discussed). In these devices the pixels can have little intrinsic color on transmission in the off state, such that it can be desirable to include a color filter on the camera chip. Such an approach also can allow for a conventional Bayer type color filter on the camera chip when a microlens array is utilized, as discussed elsewhere herein.

Figure 5A:
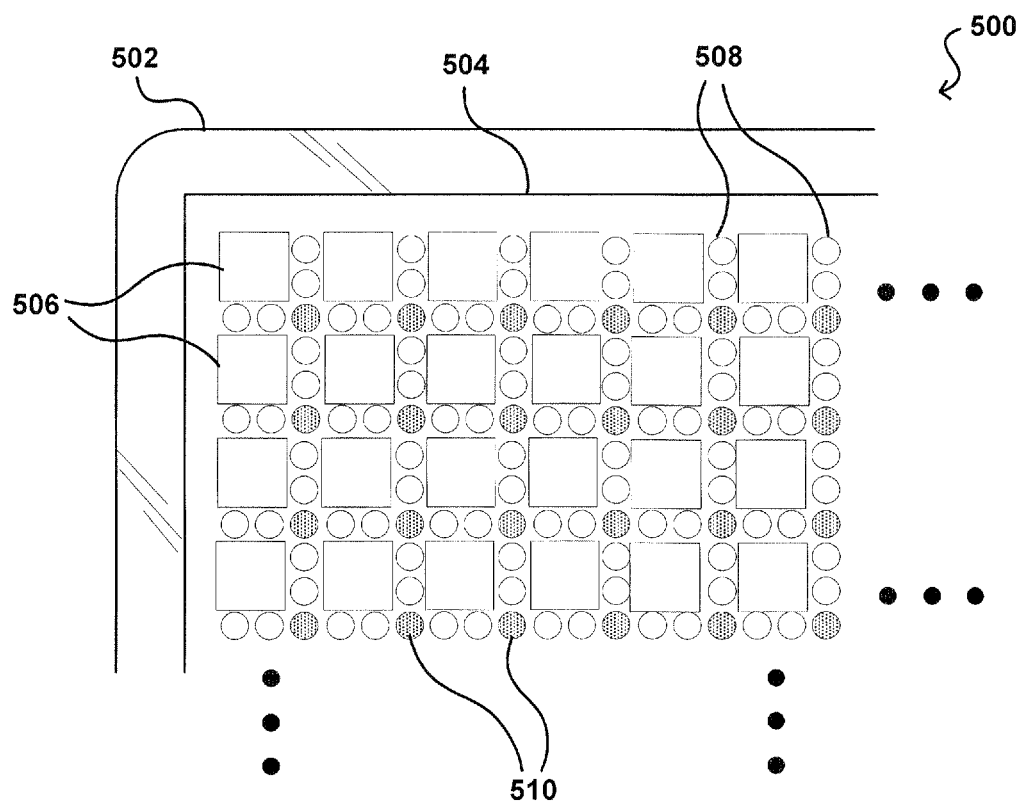
FIGS. 5(a) and 5(b) illustrate example a first example configuration of a display-integrated camera that can be utilized in accordance with various embodiments.
Figure 5B:
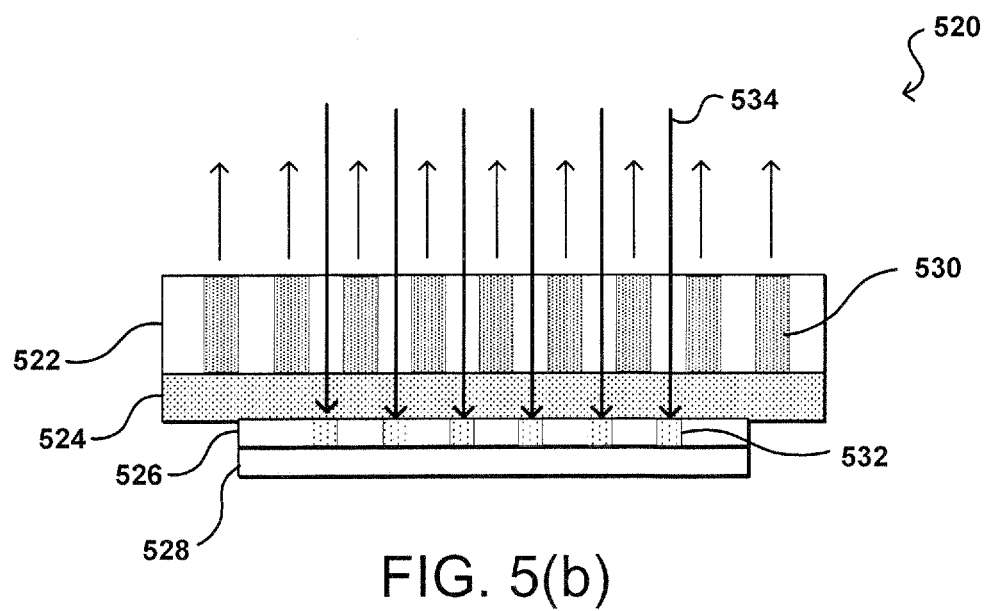

Approaches in accordance with other embodiments can instead (or additionally) take advantage of the interstitial regions between pixel elements of a display. For example, FIG. 5(*a*) illustrates an example configuration 500 wherein a computing device 502 includes a display screen 504 where the pixels are provided using an array of discrete emitters 506, such as LEDs, that are separated a determined distance from each other. Approaches in accordance with various embodiments can take advantage of these interstitial spaces to position an array of microlenses or other such objects, which can capture light that is incident on the display screen and passes between the emitters. In this example the microlenses are shown in two colors, white 508 and shaded 510, to signify that the microlenses can be positioned between adjacent pairs of emitters (the white microlenses 508), at the junctions between four emitters (the shaded microlenses 510), or both. Other positions can be utilized as well, and there can be additional or fewer microlenses at each such position in various embodiments. Further, although the microlens array is shown to go to near the edge of the display screen 504 in this example, it should be understood that the array can occupy only a portion of the display screen area, as discussed elsewhere herein.

In some embodiments, the microlenses can be integrated in a layer with the emitters. In other embodiments, a layer 526 of microlenses 532 can be positioned in a layer behind the backlight 524 and/or layer 522 of LEDs 530, as illustrated in the example configuration 520 of FIG. 5(*b*). Although the microlenses are illustrated to capture light 534 passing between the emitters, it should be understood that microlenses also can be positioned behind the emitters to capture light passing through the emitters when the emitters are not active, as discussed above.

Such an approach is possible in at least some embodiments because camera pixels tend to be smaller than display pixels. For example, conventional camera pixels can range in size from about ten microns to about one micron. A high resolution display might have about three hundred pixels per inch, with each display pixel consisting of a triad of RGB dots (one LED for each color channel), resulting in a size of about twenty five microns per dot. Due in part to the smaller size of the camera pixels, a camera die 528 can be placed on the back of, or otherwise behind, a display element with a microlens array 526 positioned between those components. An example microlens array can span several camera pixels in image space, but only one pixel or dot at the front pupil where it would be in contact, or nearly so, with the back of the display. Further, although LEDs are discussed with respect to FIG. 5(*a*), it should be understood that the interstitial areas of other display screens can be utilized as well. These can include, for example, AMOLED and LCD displays, among others.

In some embodiments, the camera sensors can be calibrated and/or configured such that the sensors can also capture image information while the emitters are active. While such an approach might not provide the same level of color depth in some embodiments, an advantage is that the display screen can act as a light source for the camera, such that for operations such as video chat the image quality can potentially be improved (in at least some situations) without having to activate a separate light source.

Using an array of microlenses also can have an advantage in that the resulting image can have properties similar to that of a light-field image. While computation is needed to assemble information from the various images, the computational process also can adjust the focus of the resulting conventional image. While generating an image with infinite depth of field might not be desirable for artistic images, such an effect might in fact be preferred for videoconferencing and similar applications and uses.

In some embodiments that utilize diffractive features to direct light as part of a backlight layer, the microlenses can also be formed as diffractive lenses in the same or a similar layer. Such an approach can help to reduce the thickness of the overall display and camera assembly, and can potentially help with alignment issues, assembly costs, and other such aspects.

In some embodiments the duty cycle of the display can be adjusted to increase or decrease the brightness of the display. Such an approach can be used to decrease the brightness when the user is in a dark area, or increase the brightness when the user is in a bright area. Such an approach can be beneficial for image capture, as when the surrounding region is dark the duty cycle will be lower, and there will be longer periods between when the display is active. The camera thus can utilize a longer exposure period during these times, which helps to obtain additional information in a dark region. When it is bright out, the duty cycle of the display will be higher and the potential exposure time of the camera lower, but this can be configured to provide adequate results as a camera generally will require less exposure time in a bright environment. Thus, in at least some embodiments the camera/display assembly can be self-gating, with the exposure time being tied to the duty cycle of the display screen, which in turn might be controlled using data from a light sensor or other such element. In some embodiments, the camera exposure circuitry can be tied to the display modulation circuitry for the appropriate synchronization.

Figure 6:
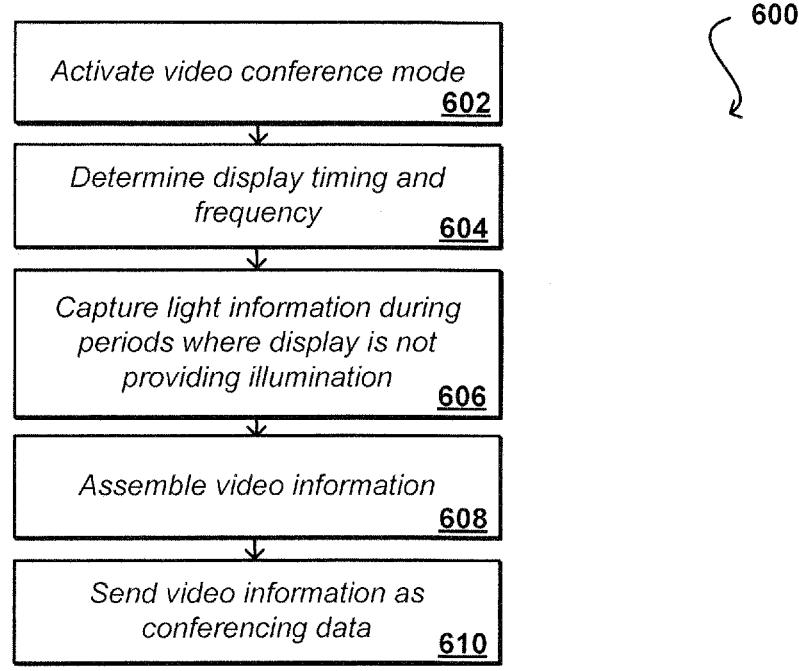
FIG. 6 illustrates an example process for operating a display integrated camera that can be used in accordance with various embodiments.

FIG. 6 illustrates an example process 600 for capturing video information of a user viewing a display screen of a computing device that can be utilized in accordance with various embodiments. It should be understood, however, that there can be additional, fewer, or alternative steps performed in similar or alternative orders, or in parallel, within the scope of the various embodiments unless otherwise stated. In this example, a videoconferencing or similar mode is activated 602 on a computing device. The videoconferencing mode can be activated using any appropriate mechanism or trigger, such as the user manually activating the mode, upon the user opening an appropriate application on the device, in response to receiving an incoming video chat request from an approved user, or upon any other such action or event. Upon videoconferencing being activated, timing and/or frequency information for a display screen of the computing device can be determined 604, such as may vary based upon surrounding light levels or brightness settings, among other such options. As discussed, this can involve display modulation circuitry and/or other such components. Camera exposure circuitry and/or other camera control components can cause light information to be captured 606 during periods when the display screen is not actively producing light to generate an image on the display. As discussed elsewhere herein, however, certain embodiments can also capture light during operation of the display, although other timing options can be used as well as discussed elsewhere herein. Using the captured light information, a stream of video data or other such video information can be assembled 608, such as by combining information for each of an array of microlenses. The video data can be transmitted 610 to one or more other users or devices that are associated with the videoconference, video chat, or other such communication mechanism. Accordingly video information received from other users or devices can also be displayed on the display screen, audio from any party can be transmitted and played for any other party, etc.

Figure 7:
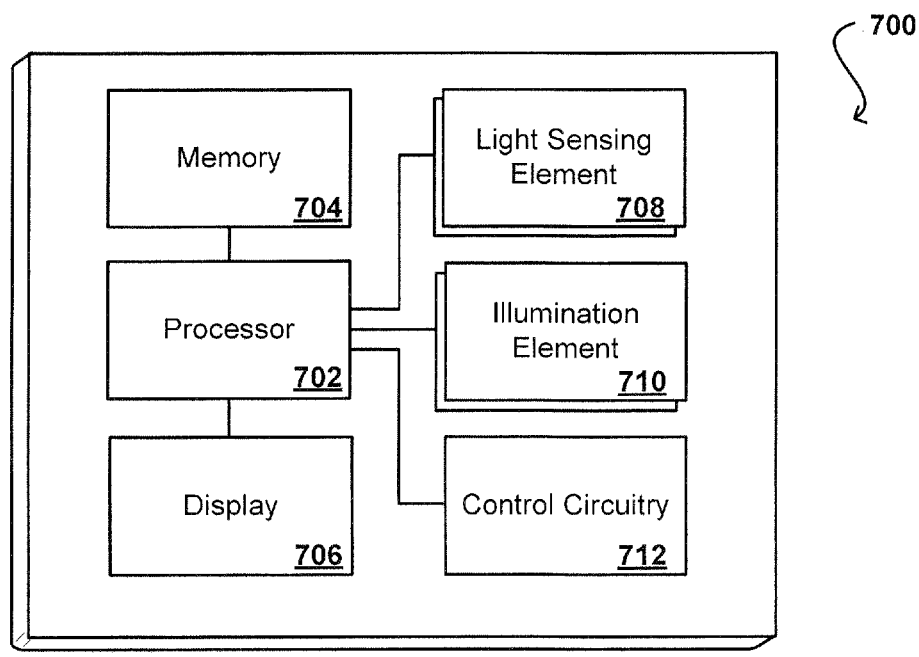
FIG. 7 illustrates an example set of components that can be utilized in a device such as that illustrated in FIG. 1(b)

FIG. 7 illustrates a set of basic components of an example computing device 700 such as the devices described with respect to FIG. 1(b). While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes at least one processor 702 for executing instructions that can be stored in a memory device or element 704. As known in the art, the device can include many types of memory, data storage or non-transitory computer-readable storage media, such as a first data storage for program instructions for execution by a processor 702, a separate storage for images or data, a removable memory for sharing information with other devices, etc.

The device typically will include at least one type of display element 706, such as a liquid crystal display (LCD), organic light-emitting diode (OLED) display, a plasma display, or a digital light processing (DLP) display, as discussed herein. The display element can include at least one transmissive layer, element, or component that is at least partially exposed to contact by a user. The transmissive element cell can be selected such that the element does not absorb an appreciable amount of light or IR radiation, such that the element can enable transmission of a displayed image as well as propagation of radiation used to provide touch input, which might be in a direction transverse to that of the light for image display. As mentioned, the device can include one or more illumination elements 710, such as IR LEDs, laser diodes, or other such components, positioned with respect to the transmissive element of the display 706 such that at least a portion of the light or radiation transmitted into an edge of the transmissive element is incident upon at least one internal edge of the transmissive medium so as to undergo total internal reflection at least when the interface of that edge is with ambient air or another such environment. The generation and timing of the radiation emission from the illumination element(s) 710 can be controlled using various control circuitry including components known and configured for purposes such as pulsing LEDs. At least a portion of the internally light or radiation then can be detected by one or more light or radiation sensing elements 708, such as IR sensors or light detectors, photodiodes, and the like. In at least some embodiments, illumination elements 710 and light sensing elements 708 are configured to handle IR radiation over an appropriate wavelength, such as 940 nm or other wavelengths above 900 nm. The detectors can be any appropriate detectors, such as CMOS sensors operable to detect radiation in a wavelength range of at least, for example, 910 nm to 970 nm. In embodiments using multiple IR LEDs, the LEDs can be scanned in sequence for some applications in order to reduce power consumption or simplify touch location determination. For other applications, various subsets of the IR LEDs can be used at different times in order to illuminate various portions or regions, etc.

An example computing device also can include other components, such as at least one motion-determining element (e.g., an accelerometer or gyro element) that can be used to determine motion of the device, which can be used to trigger or adjust a touch input mode as discussed elsewhere herein. The device can also include at least one image capture element for capturing ambient light image information about the user of the device. The imaging element may include, for example, a camera, a charge-coupled device (CCD), a motion detection sensor, or a radiation sensor, among many other possibilities.

The device can support other types of input as well. For example, the device can include a touch- and/or pressure-sensitive element around at least a portion of the device, such as on the back and/or sides of the device. Using such material, the device is able to determine whether a user is actively holding the device and/or can enable the user to apply input by squeezing at least a portion of the device. The input information could be used to trigger a detection mode or other such process. The device can also include a microphone or other such audio-capturing device. The device in at least some embodiments can trigger various actions or modes based upon sound detected by the microphone. For example, if the device detects speech from a person, the device might activate a detection mode to enable that person to provide motion input. The device can include at least one additional input device able to receive conventional input from a user. This conventional input can include, for example, a push button, touch pad, touch-sensitive element used with a display, wheel, joystick, keyboard, mouse, keypad or any other such device or element whereby a user can input a command to the device.

In some embodiments, one or more icons or other notifications might be displayed on the device to indicate to the user that IR illumination is active, or that touch determination is being performed. In some embodiments, a light (e.g., LED) on the device might illuminate in order to notify the user that touch detection is activated in order to signal to the user that the user can provide input via various motions or finger positions. Various other notifications can be used as well as appropriate.

Figure 8:
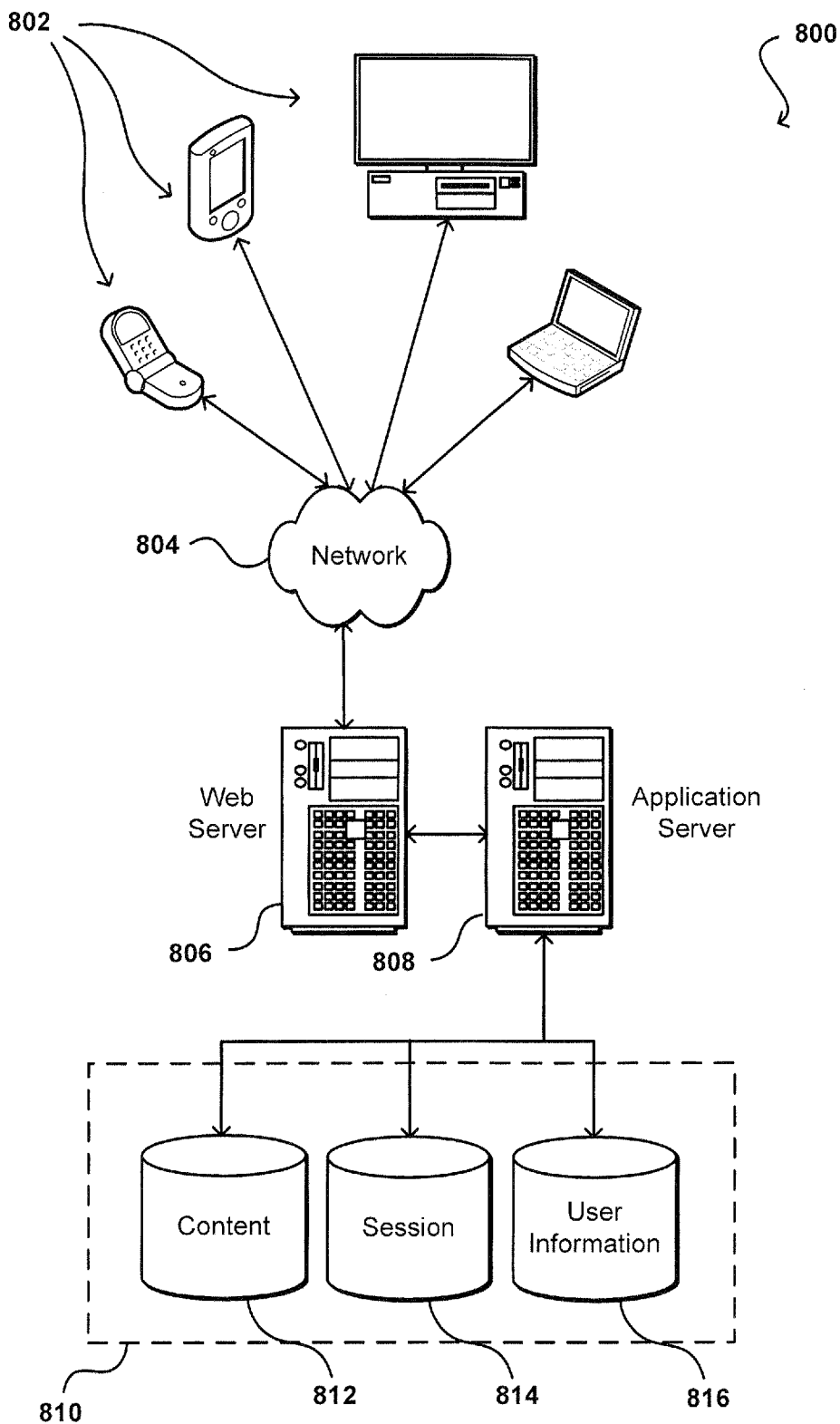
FIG. 8 illustrates an example an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML, or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
 a processor;
 a display screen including a plurality of pixel regions for producing an image on a first side of the display screen, the display screen including a focus region positioned to emphasize for a user a location on the display screen that is within a predetermined distance of a camera of the computing device, wherein the camera includes a plurality of lenses positioned to receive light incident on the first side of the display screen and passing through regions of the display screen between the plurality of regions;
 one or more polarization layers operable to control a polarization of a portion of a light passing through both the display screen and the one or more polarization layers in response to an activation of the one or more polarization layers; and
 memory including instructions that, when executed by the processor, cause the computing device to collect image information captured by the camera in response to the activation and use the image information to form a digital image.

2. The computing device of claim 1, wherein each of the pixel regions is provided by at least one emitter, and wherein each of the plurality of lenses is a microlens positioned between at least two of the emitters.

3. The computing device of claim 1, wherein the camera further includes lenses operable to capture light passing through at least a portion of the plurality of pixel regions.

4. The computing device of claim 1, wherein the instructions when executed further cause the camera to capture the image information between successive active periods of the display screen.

5. The computing device of claim 1, wherein the image information captured by the camera is assembled into video data, the computing device further configured to provide a stream of the video data as part of a communication session.

6. The computing device of claim 1, wherein the plurality of pixel regions each correspond to a respective light emitting diode (LED).

7. The computing device of claim 1, wherein the plurality of pixels regions each correspond to a set of three LEDs.

8. A computing device, comprising:
at least one processor;
a display screen including a display layer for producing an image viewable from a first side of the display screen, the display screen including a focus region positioned to emphasize for a user a location on the display screen that is within a predetermined distance of a camera of the computing device, the camera positioned on a second side of the display screen, the camera positioned to receive light incident on the first side of the display screen and passing through the display layer;
one or more polarization layers operable to control a polarization of a portion of a light passing through the display layer and the one or more polarization layers in response to an activation of the one or more polarization layers; and
memory including instructions that, when executed by the at least one processor, cause the computing device to:
cause the display screen to display content according to a determined refresh rate for the display screen; and
cause the camera to capture image information in response to the activation.

9. The computing device of claim 8, wherein the display layer includes a liquid crystal material, and wherein the liquid crystal material is configured to be activated to enable at least a portion of the light incident on the first side of the display screen to pass through the display layer.

10. The computing device of claim 8, wherein the display screen includes an array of colored filters, and wherein the instructions when executed further enable the processor to compose the image information into an image.

11. The computing device of claim 8, wherein the camera is operable to capture video information, and wherein the instructions when executed further enable the computing device to transmit the video information to at least one other computing device.

12. The computing device of claim 11, wherein the video information is transmitted as part of a videoconference or video chat session.

13. The computing device of claim 8, wherein the camera is positioned to capture light passing through an opening in a reflective member positioned to reflect light towards the display screen.

14. The computing device of claim 8, wherein the instructions when executed further cause the computing device to display a graphical element indicating a location of the camera with respect to the display screen.

15. The computing device of claim 8, further comprising:
a light sensor configured to determine an amount of light near the computing device,
wherein the refresh rate is adjusted based at least in part upon the amount of light determined by the light sensor, and
wherein an exposure time of the camera is capable of being updated according to changes in the refresh rate.

16. The computing device of claim 8, wherein image information is captured after a determined number of duty cycles.

17. A computer-implemented method, comprising:
producing an image viewable from a first side of a display screen of a computing device, the display screen including a focus region positioned to emphasize for a user a location on the display screen that is within a predetermined distance of a camera of the computing device, the camera positioned to receive light incident on the first side of the display screen and passing through regions of the display screen, the camera positioned on a second side of the display screen;
controlling a polarization of a portion of a light passing through the display screen in response to an activation of one or more polarization layers;
displaying content according to a determined refresh rate for the display screen; and
capturing image information in response to the activation.

18. The computer-implemented method of claim 17, wherein the camera includes a plurality of microlenses each positioned at least one of between or behind one or more active elements of the display screen, and further comprising:
composing the captured image information into a stream of video data.

19. The computer-implemented method of claim 18, wherein the stream of video data is provided as part of a videoconference, and wherein the content displayed on the display screen is video data captured by another computing device.

20. The computer-implemented method of claim 17, wherein the display screen includes a plurality of LEDs, and wherein the plurality of LEDs are selectively activated according to the refresh rate.

21. The computer-implemented method of claim 17, wherein the display screen includes a liquid crystal material, and wherein liquid crystal material is activated to a white state during a period of image capture in order to enable light to pass through the display screen.

22. The computer-implemented method of claim 17, wherein the display screen includes an array of colored filters.

23. The computing device of claim 1, wherein the polarization of the portion of the light is changed by the one or more polarization layers.

* * * * *